Figure 1:
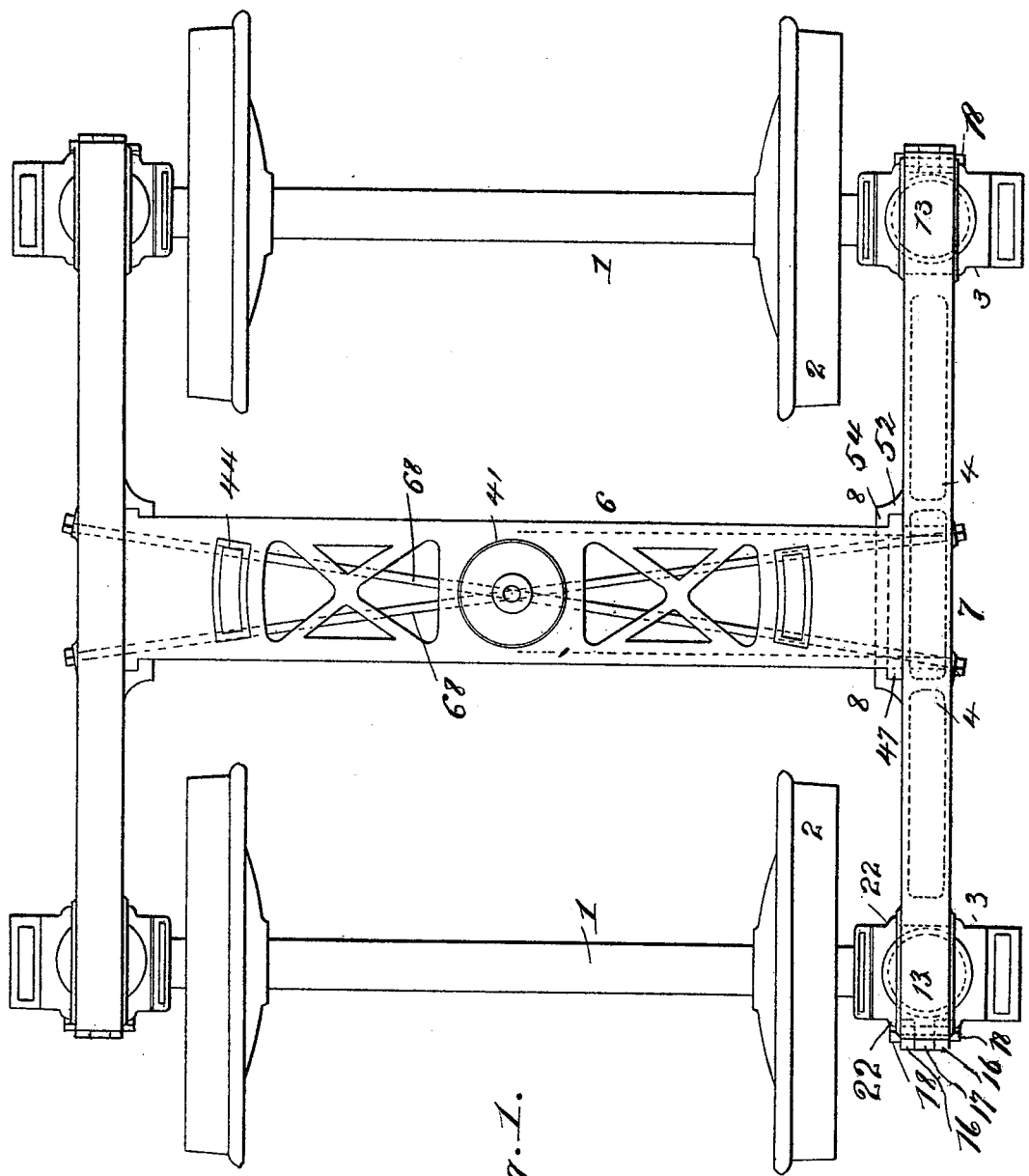

No. 635,357. Patented Oct. 24, 1899.
L. B. SMYSER.
CAR TRUCK.
(Application filed Aug. 21, 1896.)
(No Model.) 4 Sheets—Sheet 1.

WITNESSES

INVENTOR
Louis B. Smyser
BY
ATTORNEY

No. 635,357. Patented Oct. 24, 1899.
L. B. SMYSER.
CAR TRUCK.
(Application filed Aug. 21, 1896.)
(No Model.) 4 Sheets—Sheet 2.
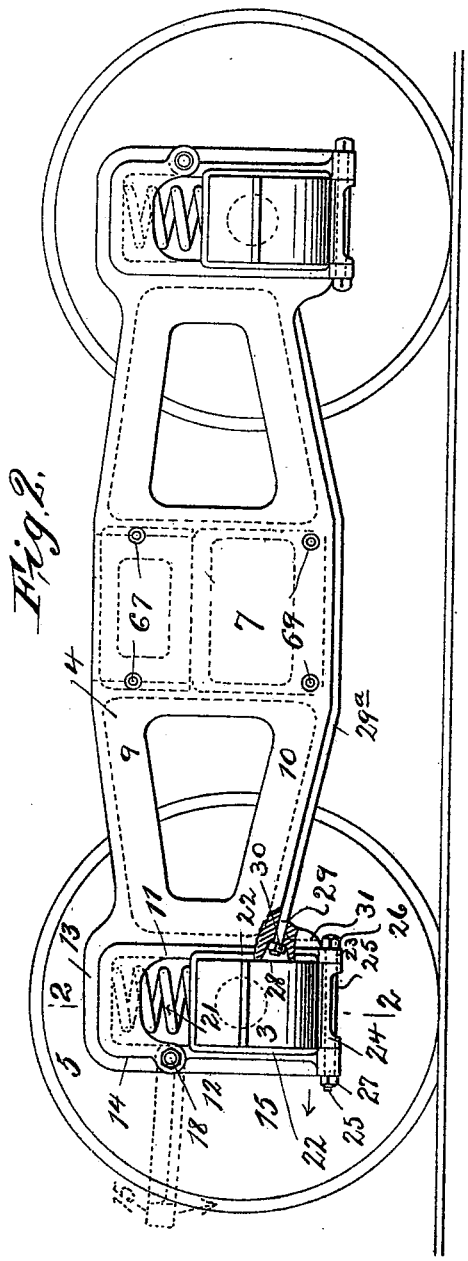
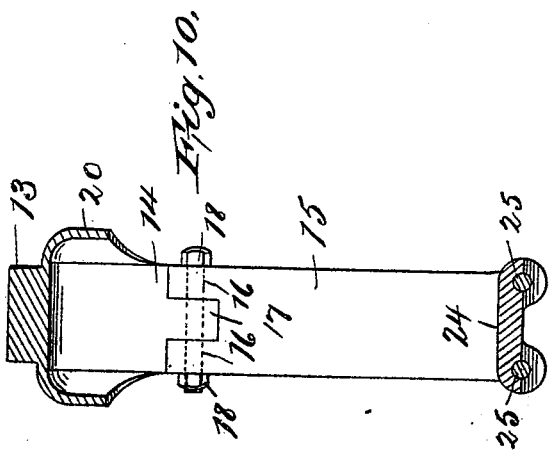
WITNESSES
INVENTOR
Louis B Smyser,
BY
ATTORNEY No. 635,357. Patented Oct. 24, 1899.
L. B. SMYSER.
CAR TRUCK.
(Application filed Aug. 21, 1896.)
(No Model.) 4 Sheets—Sheet 3.
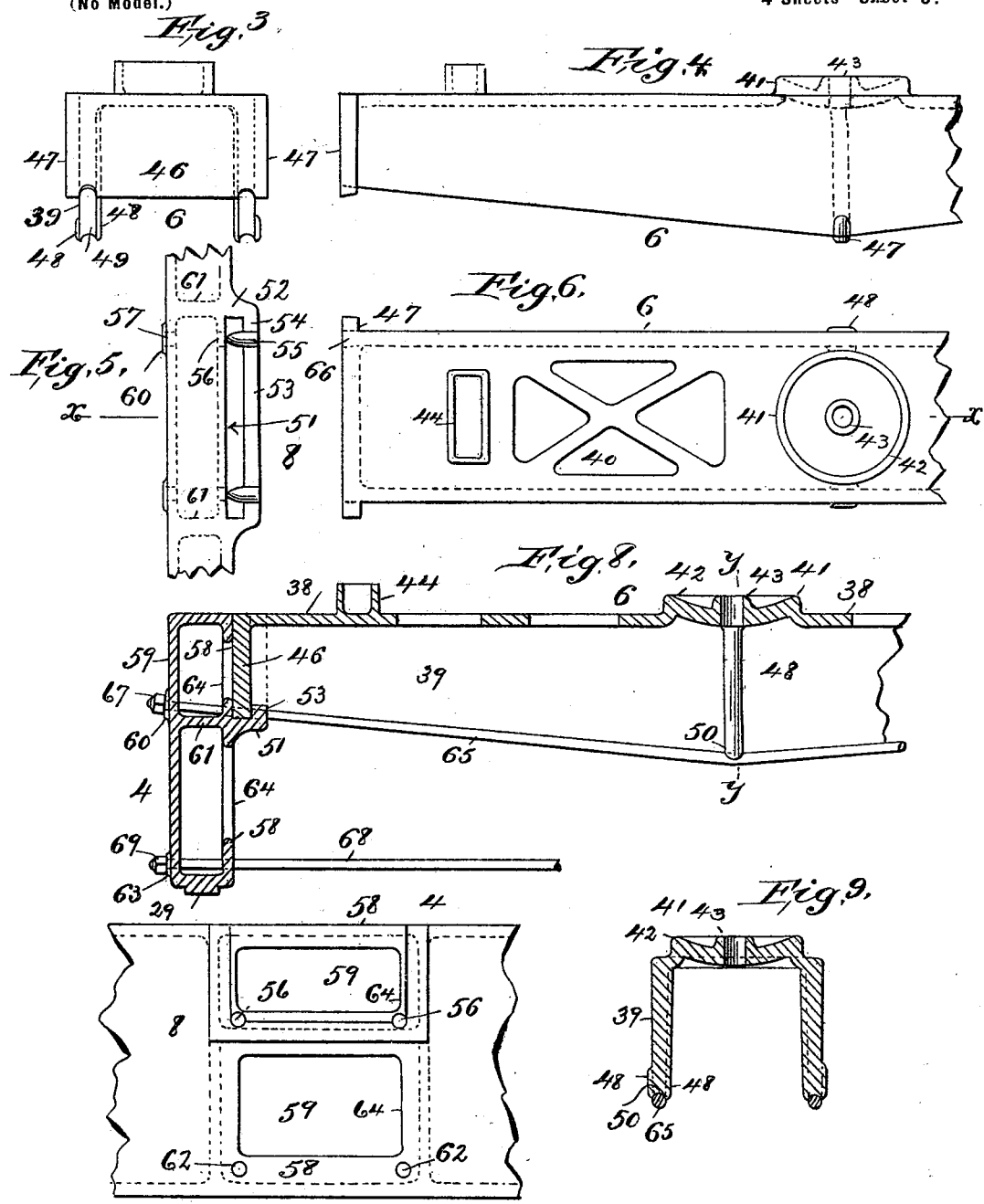
WITNESSES
INVENTOR
Louis B. Smyser
BY
ATTORNEY No. 635,357.  
L. B. SMYSER.  
CAR TRUCK.  
(Application filed Aug. 21, 1896.)  
(No Model.)  
Patented Oct. 24, 1899.  
4 Sheets—Sheet 4.
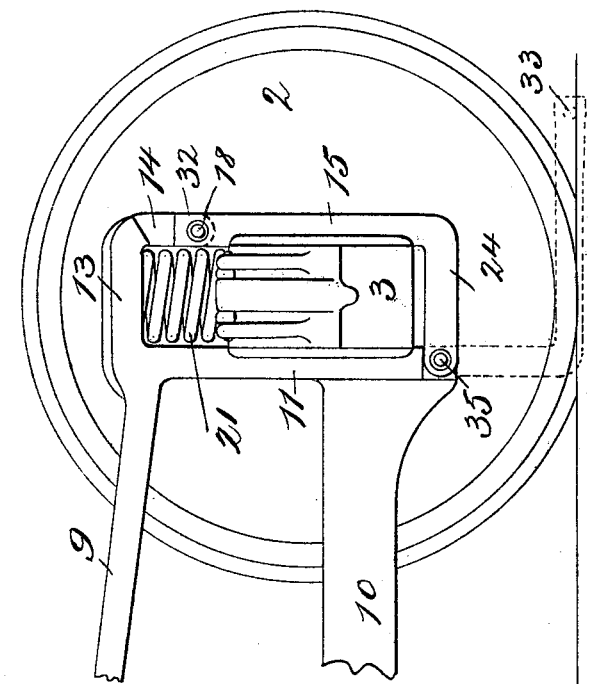
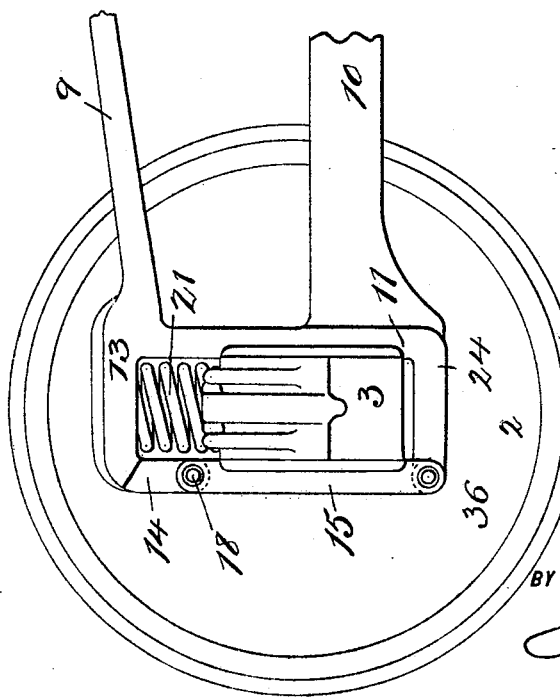
WITNESSES
INVENTOR  
Louis B. Smyser  
BY  
ATTORNEY

United States Patent Office.

LOUIS B. SMYSER, OF PHILADELPHIA, PENNSYLVANIA, ASSIGNOR TO JOHN A. BRILL, OF SAME PLACE.

CAR-TRUCK.

SPECIFICATION forming part of Letters Patent No. 635,357, dated October 24, 1899.

Application filed August 21, 1896. Serial No. 603,456. (No model.)

*To all whom it may concern:*

Be it known that I, LOUIS B. SMYSER, a citizen of the United States, residing at Philadelphia, county of Philadelphia, State of Pennsylvania, have invented certain new and useful Improvements in Car-Trucks, of which the following is a specification.

My invention has for its primary object to improve the construction of freight - car trucks, although such improvements can be employed in car-trucks generally.

The improvements hereinafter described are mainly directed first to facilitate the removal of an axle and wheels, with its accompanying axle-boxes, from the truck without the necessity for excessive jacking up of the truck, or a like dismemberment of the truck, in order to get the axle and wheels and boxes out for repair or substitution, and this feature of my truck comprises side frames, the yokes of which are made separable in the direction of the length of the truck, or longitudinally, so as to allow the withdrawal of the boxes, axle, and wheels at either or both ends of the truck for repair, &c.

My invention consists in the general construction of the truck, which has for its object, among other things, the cheapening and strengthening of the same.

The truck, so far as its frame is concerned, constructed in accordance with my invention comprises practically three solid parts—two solid side frames and one solid cross-bolster, with its center bearing and side bearings. In this regard one of the features of the construction of the truck resides in the formation of the socket on the inner side of each of the side frames and a cross-bolster constructed at its ends to fit in said socket, which allows of a flush connection at the top between the side frames and the cross-bolster, the side of the side frames receiving the weight instead of the top, by means of which bolting the bolster to the side frames can be dispensed with. Although this is not absolutely essential in the carrying out of my improvement, I prefer to tie the bolster and side frames together by a brace or braces, which may lie under and in close contact with the bolster.

My invention further consists in the general construction and combination of parts hereinafter described, and further recited in the claims.

In the drawings forming part of this specification, Figure 1 is a plan view of a truck embodying my improvements; Fig. 2, a side elevation thereof; Fig. 3, an end elevation of the bolster; Fig. 4, a side elevation of the same; Fig. 5, a plan view of a fragment of the side frame; Fig. 6, a plan view of one-half of the cross-bolster; Fig. 7, an inside elevation of a fragment of the side frame corresponding to Fig. 5; Fig. 8, a sectional elevation approximately through the center of the bolster and side frame on the line $x\ x$, Figs. 5 and 6; Fig. 9, a sectional elevation transversely through the bolster and center bearing approximately on the line $y\ y$, Fig. 8; Fig. 10, a sectional elevation approximately on the line $z\ z$, Fig. 2; Figs. 11 and 12, respectively, side elevations of ends of a side frame embodying certain features of improvement.

Similar numerals of reference indicate corresponding parts throughout the several views.

In the drawings forming part of this specification, 1 indicates the usual axles, 2 the wheels, and 3 the axle-boxes, all of the usual or desired construction. At 4 are the side frames, provided with integral yokes 5 and cross-bolster 6.

My present construction, so far as it relates to the general construction of the truck, differs, essentially, from the majority of freight-car trucks in that the usual spring-plank, springs, and swing-bolster are omitted, and instead of the car-springs being placed between the side frames and the bolster, or, in other words, the car-spring supported upon the side frames the spring-support is derived from springs located between the tops of the axle-boxes and the yokes of the side frames, which latter take the place of equalizing-bars, the construction being such as to permit of a considerable rise between these two parts in order that a sufficient length of spring can be used.

The foregoing description briefly sets forth the particular type of truck in which I have embodied my improvements; but it will be clear from the following that many of these improvements can be embodied in trucks differing in type and construction from the one herein illustrated.

The side frames consist, essentially, of the central or socket section 7, having the sockets 8, the yokes 5 at each end, and the intervening or connecting chords 9 10, converging from the socket-section to the yokes, the body of the side frame being preferably of hollow cast-steel.

The yokes comprise, essentially, two jaws 11 12, a longitudinal and integral extension 13 from the top of the jaw 11, and a downward projection 14, formed integrally on the end of the extension 13, the inner jaw 11 being cast solid with the side frame, the outer jaw 12 being made in two parts. The lower part 15 being hinged to the upper part 14 by being provided with a bifurcation 16 and the upper part with a central lug 17, both being apertured to permit a bolt 18 to pass through, so that the lower part 15 can be swung up or down on the bolt. The top cross-bar or extension 13 of the yoke and the inner portions of the parts of the yoke-arms 11 14 15 are widened transversely to provide bearing-surfaces for the boxes 3, and at the top of the yoke or depending from the extension 13 a housing 19 is formed by the integral webs 20, and between the top of the axle-box 3 and the extension 13 the car-springs 21, preferably spirals, extend, the housing receiving the tops of said springs. The axle-boxes are provided with lips 22 for engaging the sides of the yoke-jaws 11 15. The lower portions of both of the yoke-jaws are provided with apertured lugs 23, and extending between these lugs is an apertured block or cross-bar 24, and through the lugs and cross-bar extend bolts 25, secured by nuts 26 27 on the outside of the lower portions of the yoke-jaws, the outside nut 27 being removable from the bolt for a purpose hereinafter described. Instead, however, of using the detachable block 24 the block or its equivalent may be made integral with the part 15, the parts 11 13 14 15 forming a rectangular inclosure with two vertical sides for the bearing-surfaces of the axle-boxes.

The lower portions of the inner yoke-jaws 11 are provided with recesses 28, from which extends a squared aperture 29, and extending between the yoke-arms and directly under the side frames is a flat tie-rod 29ᵃ, the nuts 30 of which pass between the corner-flanges 31, uniting the lower portions of the chords 10 with the yoke-jaw 11, and through the hole in the jaw 11, the ends of which are threaded and are provided with the securing-nuts 30 for tying the rod to the yokes. This rod 29 strengthens the yoke structure and securely ties the yokes to the side frame.

During the use of trucks, and especially those employed in freight service, it often becomes necessary to remove the axle-boxes and wheels, and to do this, as before stated, many parts have to be removed. In my construction, however, to permit of the removal of the axle, wheels, and boxes from one or both ends it is only necessary to place a block or jack between the side frames and some suitable support and to block or jack up the side frames sufficient to take the weight on the truck off the springs 21, and by removing the nut or nuts 27, so as to free the bolt or bolts 25 from the lower or separable portion 15 of the outer yoke-jaw 12, the said separable portion can be swung upwardly on its pivot 18, so as to allow all parts to clear the top of the box 3, as shown in dotted lines in Fig. 2, the parts being intentionally proportioned that the upper portion of the box will be below the opening formed by swinging up the part 15 of the yoke, and I prefer that the parts be so proportioned that this relative arrangement will be present even when the car-springs 21 are bearing their normal load or when they are depressed to their calculated capacity; but should the springs by reason of weakness or the like bring the opening in the yoke below the top of the box the side frames can be raised a trifle by jack or otherwise to bring the top of the box below the bottom of the opening. In either event after the longitudinal separation of the outer portion of the yoke has been made the axle, its wheels, and boxes can be rolled away from the truck. Instead, however, of employing the construction shown in Figs. 1 and 2 of the drawings the forms illustrated in Figs. 11 and 12 can be employed. In the case of Fig. 12 the top chord 9 of the side frame is provided with the extension 13 and a depending projection 14, all integral with the side frame, and to the lower portion of the yoke-arm 11 is hinged an L-shaped member comprising the upright portion 15 and the horizontal portion 24, (both of which correspond with the same parts in Fig. 2,) the top of the upright being provided with a bifurcation 32 and apertures 33, through which passes a bolt 18, the lower portion of the depending projection 14 being provided with an aperture 34, through which said bolt 18 passes, and the end of the horizontal portion 24 being bifurcated and engaging the lower portion of the yoke-arm 11, to which it is pivoted by means of a bolt 35, which passes through the bifurcation and the aperture in the yoke-arm. In this case a rectangular separable portion of the yoke-spring is pivotally secured to the lower portion of the yoke, which allows the separable yoke-spring to swing downwardly, as shown in Fig. 12, or, instead of this construction, I have employed, so far as the yoke construction is concerned, almost exactly the same elements as illustrated in Figs. 1 and 2, except that I have substituted for the cross-bar 24 and bolts 25 a cross-bar 24, formed integrally with the arm 11 and bifurcated at the end of the separable yoke element 15, so as to permit it to engage said cross-bar and to pass a securing-bolt 36 through the bifurcation, and by removing the nut 37 and bolt 30 the separable yoke portion may be swung upwardly and the axle-boxes and wheels removed, as before described, and without manually elevating the separable portion.

I am aware that I am not the first to provide the yokes or axle-box pedestals of a truck-frame with a removable part, so as to allow of the axle, wheels, and boxes to be removed bodily from the truck-frame.

The axle-box yokes or pedestals wherein detachable parts have been employed so far as I know have been comprised within two main classes. One class embraces the form known as the "horn-plate," which is an inverted-U-shaped casting secured to the wheel-pieces, and the other is where upright bolts are used, such as in the diamond-frame trucks. In the former case in order to remove the boxes, axles, and wheels the truck has to be jacked up to entirely free the opening in the horn-plates from the boxes or the horn-plates have to be removed bodily from the wheel-pieces. In the latter case the upright bolts either engage grooved ribs on the sides of the boxes or pass through apertured lugs on the boxes, but in both instances are bolted rigidly to the ends of the truck-frame, and to remove the boxes from the frame the entire bolts or the bolts and castings, when they are employed, as is usual, to form bearings for the boxes, have to be bodily removed vertically. This is accomplished only after driving the bolts through a number of holes and releasing a number of parts. Besides this the vertical bolts almost invariably become bent by reason of the strain being placed directly upon them transversely and their removal thereby either hindered or rendered impracticable.

There is a further class of yokes or pedestals wherein all the parts are made integral either of cast-steel, pressed steel, or forged steel. In this case no provision for allowing a longitudinal separation of the yokes has been to my knowledge made.

My invention involves the employment of solid surfaces to oppose the action of the axle-boxes as distinguished from a bolt, the bolts in my case merely providing means for detachably securing the parts together, and, as indicated, I prefer that the bolts lie horizontal, either in line with the truck-frame or transversely, and merely act as hinging-points instead of strain-resisting elements.

A further part of my present improvements relate to the construction of the cross-bolster for the center bearing and side bearings and the means for securing the bolster to the side frame, which involves improvements in the construction of the side frame for this purpose, as hereinafter described. The main feature of my present invention so far as this part of it is concerned relates to rigidly securing the bolster to the side frame of the truck.

The bolster comprises the top plate 38 and the side depending walls 39 of inverted-arch shape, the top plate being provided with openings 40 for the reduction of weight, if desired, and centrally the bolster is provided with a center bearing 41, provided with the exterior annular flange 42 and centrally-apertured lug 43, integral with the top plate of the bolster and of the conventional form or any other desired form, and the top plate is further provided with the side bearing-cups 44 of usual or any desired formation, all formed integral with the top plate of the bolster. The ends 45 of the bolster are provided with depending flanges or webs 46, integral with the side and top pieces, the end pieces having outwardly-extending flanges 47, and centrally of the bolster the side pieces are provided (specifically on the interior) with vertical enlargements or ribs 48. The side pieces are deepest in the center and extend from the end pieces obliquely downward to the ribs 48. The bottom of the side pieces are recessed, as at 49, and the ribs at their juncture with the bottom of the side pieces form a bifurcation 50.

I have not shown a full vertical rib on the exterior of the side pieces, as the inner rib gives sufficient strength of resistance to vertical strains, and to form the bifurcation or restraining element 50 either the full vertical rib can be used on the exterior or the short lug, as illustrated in Figs. 4 and 9. The central portion on the inner side of the side frame is provided with a socket 8, formed by the horizontal and vertical outwardly-extending flanges 51 52, from each of which extend upwardly and outwardly and at right angles the flanges 51 52 further flanges 53 54, and at the junction of the upright and horizontal flanges 53 54 and in the flange 51 is formed an inclined groove 55, which lies in line with holes 56 57, formed in the inner and outer webs 58 59 of the side bar, the outer holes being reinforced with the bosses 60, the flange 51 being reinforced by a cross-web 61, formed integrally with the webs 58 59. The lower portions of the exterior and interior side webs 58 59 of the side frames are provided with holes 62 and exterior bushings 63. The side frame is preferably provided also with apertures 64 to reduce the weight thereof.

By the above construction the ends of the bolster and the sides of the side frames are provided with interlocking devices for receiving each other without the use of bolts, the weight of the bolster being taken on the flanges 51 on each of the side frames. However, in order to secure the bolster and side frames together rigidly I provide truss-rods 65, which lie in the grooves 49 along the bottom of the side pieces and which pass through the grooves in the socket and in the end pieces (dotted lines 66, Fig. 6) and through the holes 56 57 in the webs of the side frames, their ends being provided with exterior nuts 67, as illustrated in Fig. 8, the bifurcation 50 on the side pieces confining the rods in place at the center.

To further strengthen the union of the bolster and side frames I employ the tie-rods 68, which likewise pass through holes 62 in the side webs at the bottom, their ends being provided with exterior nuts 69, as shown in Fig. 8, which rods I preferably cross in the center, as indicated in Fig. 1.

From the foregoing construction it will be clear that the cost of the truck is considerably cheapened and the construction simplified and a strong durable structure provided, easy of assemblage and dismemberment, providing a maximum of strength where most desired, with a reduction in weight, bulkiness, and cost.

Having described my invention, I claim—

1. An axle-box pedestal or yoke, comprising a fixed portion, the latter forming the inner side and top and the upper part of the outer side of the pedestal, and a removable portion forming the remainder of the outer side and bottom, a pivotal connection between the fixed portion and the removable portion at the upper juncture, and a bolt connecting them at their lower juncture, substantially as described.

2. In a car-truck, the combination with the side frame having the inner yoke-arm 11, top cross-bar 13, pendent projection 14, and lower cross-bar 24, all made integrally with the side frame, the ends of the projection 14 and cross-bar 24 being provided with transverse holes, and a vertical bar 15 provided with transverse holes at its ends and secured to the ends of the projection 14 and cross-bar 24 by bolts, substantially as described.

3. In a car-truck, the combination with the side frame, having the enlarged central section, the tapering intermediate section, and the yokes, of a rod having its ends secured to said yokes and extending underneath said central section to support the same, substantially as described.

4. A frame for a car-truck made entirely of metal, comprising side beams, a cross-beam extending between the centers of the side beams, a rod extending between the said side beams below the cross-beam, yokes in the ends of the side beams to receive the axle-boxes and springs, and a vertical side for each yoke adapted to be secured to the frame by bolts extending transversely through the side beam, as and for the purposes described.

5. A side frame for a car-truck, comprising a double-walled central section, channel-shaped upper and lower chords extending from each side of the central section, and solid yokes on the ends of the chords, all the parts being made of a single piece of metal, substantially as described.

6. The combination in a car-truck with the side frame and its yokes, recesses and shoulders in said yokes, and a rod extending between said recesses and in contact with the under surface of said side frame, its ends being secured by nuts abutting against said shoulders, substantially as described.

7. In a car-truck, the combination with the side frames, having yokes, of the bolster connecting said yokes, and truss-rods extending between the side frames to tie the side frames and bolster together, substantially as described.

8. In a car-truck, the combination with the side frames having yokes, of a bolster extending between the side frames, truss-rods extending between the side frames near said bolster, and tie-rods extending between the side frames below said trusses, substantially as described.

9. The combination in a car-truck, of the side frames, and bolster extending between the side frames, said bolster having depending sides, a groove formed in each of said depending sides, and a truss-rod extending between said side frames and lying in said groove, substantially as described.

10. The combination in a car-truck, of the side frames, a bolster having inverted-arch depending side plates extending between said side frames, and truss-rods extending between the side frames and coöperating with said bolster side plates, substantially as described.

11. The combination in a car-truck, of the side frames, a bolster extending between the side frames, upright bracing-ribs on said bolster, and truss-rods extending between the side frames and engaging said ribs, substantially as described.

12. In a car-truck, the combination with the side frames, of the bolster extending between the side frames, truss-rods extending between said side frames in contact with said bolster, and tie-rods extending between the side frames below the plane of said bolster, substantially as described.

13. The combination in a car-truck, of the side frames, the bolster extending between the side frames, truss-rods extending between the side frames and engaging the bolster, and tie-rods extending between the side frames below the plane of said bolster, said tie-rods being diagonally disposed in a horizontal plane, substantially as described.

14. The combination in a car-truck, of the side frames having double vertical walls, a bolster extending between said side frames, alining apertures in said walls, truss-rods extending between the side frames and engaging the bolster, their ends passing through said apertures, and nuts on the ends of said rods exterior to the side frames, substantially as described.

15. The combination in a car-truck, of the side frames, of a socket formed on the inner side of each of the side frames, and a bolster having ends detachably secured in each of the sockets on said side frames, substantially as described.

16. The combination in a car-truck, of the side frames, of a socket formed on the inner side of each of the side frames, a bolster having ends detachably secured in each of the sockets on said side frames, and truss-rods extending between the side frames, substantially as described.

17. The combination in a car-truck, of the side frames, of a socket formed on the inner side of each of the side frames, and a bolster having ends detachably secured in each of the sockets on said side frames, and tie-rods extending between the side frames below the bolster, substantially as described.

18. The combination in a car-truck, of the side frames, of a socket formed on the inner side of each of the side frames, and a bolster having ends detachably secured in each of the sockets on said side frames, the bolster having depending sides, and truss-rods extending between the side frames and engaging the sides of the bolster, substantially as described.

19. The combination, in a car-truck, of the side frames, a socket formed on the inner side of each of the side frames, and a bolster having ends detachably secured in each of the sockets on said side frames, the bolster having inverted-arch depending side pieces, arched and truss rods engaging the side pieces, substantially as described.

20. The combination in a car-truck, of the side frames, a socket formed on the inner side of each of the side frames, and a bolster having ends detachably secured in each of the sockets on said side frames, the bolster having side walls grooved and ribbed, and truss-rods engaging the side frames and the grooves and ribs of the bolster, substantially as described.

21. In a car-truck, the combination with the side frames having the sockets on the inner sides thereof, the bolster having projecting and depending ends, said ends being received by the said sockets, and means for securing the side frames together transversely, substantially as described.

22. In a car-truck, the combination with the side frames having the sockets on the inner sides thereof, the bolster having projecting and depending ends, said ends being received by the said sockets, and truss-rods for securing the side frames together transversely, substantially as described.

23. In a car-truck, the combination with the side frames having the sockets on the inner sides thereof, the bolster having projecting and depending ends, said ends being received by the said sockets, truss-rods for securing the side frames together transversely, and tie-rods extending between the side frames below the truss-rods, substantially as described.

24. As a new article of manufacture, a bolster comprising a top plate and side depending plates, end pieces having projecting lugs, and a center bearing and side bearings, all formed into one homogeneous piece of metal, as and for the purposes set forth.

25. The side frame having the double walls, the longitudinal cross-web extending between the walls, said web being extended outwardly to form a supporting ledge or flange, and a bolster supported upon said flange, substantially as described.

26. The side frame having the double walls, the longitudinal cross-web extending between the walls, said web being extended outwardly to form a supporting ledge or flange, said flange having flanges extending therefrom to form a socket, and a bolster having ends in said socket, substantially as described.

27. As a new article of manufacture, the side frame having the outwardly-extending flange 51, upright side flanges 52, the flange 53 extending upwardly from the flange 51, and the flanges 54 extending inwardly from the flanges 52, forming a socket on the side frame, substantially as described.

28. As a new article of manufacture, the side frame having the double side walls, the longitudinal cross-web and the flanges 51, 52, 53, 54 comprising the socket 8, all formed into a single homogeneous piece of metal, substantially as and for the purposes set forth.

Signed at the city and county of Philadelphia, State of Pennsylvania, this 12th day of August, 1896.

LOUIS B. SMYSER.

Witnesses:
R. S. REED,
CHARLES A. WOOD.